Figure 1:
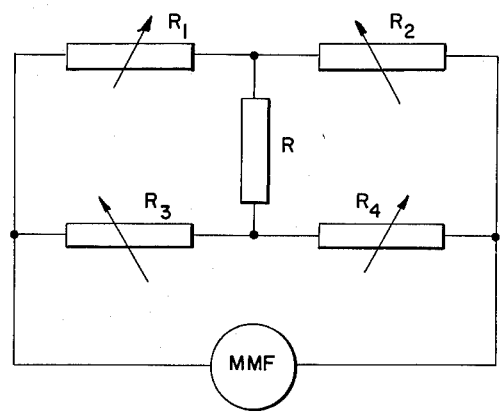

Sept. 7, 1965 E. S. NEHER 3,204,453
POWER MEASURING DEVICE FOR ROTATING SHAFTS
Filed Feb. 23, 1961 2 Sheets-Sheet 1

INVENTOR
EUGEN S. NEHER

Sept. 7, 1965  E. S. NEHER  3,204,453
POWER MEASURING DEVICE FOR ROTATING SHAFTS
Filed Feb. 23, 1961  2 Sheets-Sheet 2
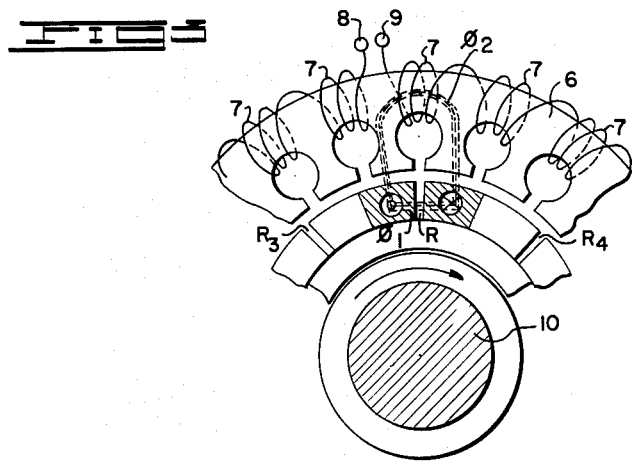
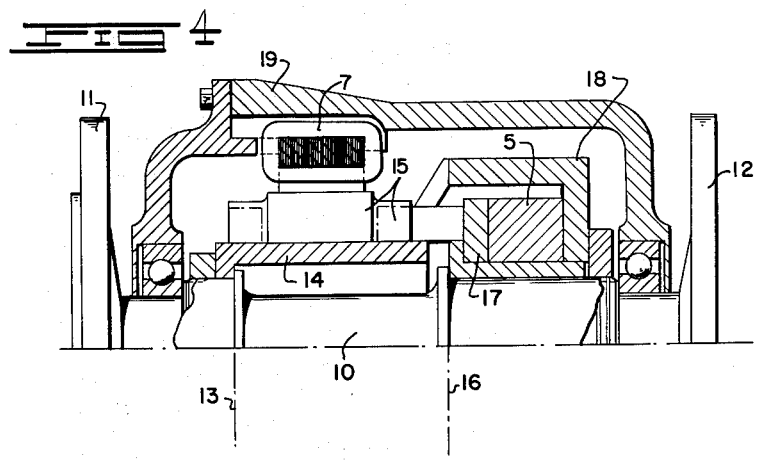
INVENTOR
EUGEN S. NEHER
BY *Dicke, Craig & Freudenberg*
ATTORNEYS

United States Patent Office 3,204,453
Patented Sept. 7, 1965

3,204,453
POWER MEASURING DEVICE FOR ROTATING SHAFTS
Eugen S. Neher, Cairo-Zamalek, Egypt, assignor to Daimler-Benz Aktiengesellschaft, Stuttgart-Unterturkheim, Germany
Filed Feb. 23, 1961, Ser. No. 91,196
12 Claims. (Cl. 73—136)

The present invention relates to an apparatus for measuring power outputs during rotation of an engine or machine part transmitting a torque. For example, a shaft or interconnected torsion rod is used for the transmission of torque. An arrangement is intended in accordance with the present invention by means of which there may be realized a direct and continuous reading on an indicator type instrument of the power or output transmitted by the shaft or torsion rod in order to enable, in particular, a determination of changes in the transmitted power.

It is already known in the prior art to utilize for purposes of measuring the torque transmitted by a shaft one or several inductances which are constituted by coils or windings with an annularly-shaped closed iron core. These coils are arranged in a fixed manner along the circumference of the shaft whereas the associated cores are composed partly of stationary and partly of rotary elements rotating in unison with the shaft. The core parts arranged on the shaft are kept at a distance from each other by the formation of an air gap in such a manner that the twisting of the shaft or of a separate torsion rod proportional to the torque changes the size of the air gap. As a result thereof, the effective permeability of the core and therewith also the inductance of the coils are changed. The respective inductance is therefore a measure for the transmitted torque and can be determined in such prior art installations by means of a conventional inductance measuring bridge. However, prior art types of this arrangement entail the disadvantage that, for purposes of measuring the inductances, separate measuring apparatus provided with their own current sources are necessary and that for purposes of determination of the power transmitted by the shaft the measured torque has to be multiplied by the number of rotations of the shaft which in turn have to be measured or determined by still other separate means.

Another type of apparatus is also known in the prior art which permits direct measurement of the power transmitted by a shaft. In this prior art apparatus, a magnetic circuit with two air gaps is arranged on the shaft which change during the transmission of a torque in opposite directions as a result of the torsion of the shaft. These air gaps are guided past stationary coils which surround the shaft so that the magnetic fluxes in the air gaps which depend on the magnitude of the respective gap induce voltages in the associated coils. These voltages are dependent on the product of the magnetic flux, i.e., the torque, and the number of rotations, i.e., the rotary speed of the shaft, and therewith on the transmitted power. However, it is necessary in this type of prior art arrangement to realize the difference of the induced voltages because with a non-twisted shaft the air gaps have a mean value and therefore voltages are also induced with an idling shaft, i.e., with a shaft that is unloaded. Only if the air gaps are exactly equal in the unloaded condition of the shaft and the series of coils are identical, then the induced voltages are equal and cancel or buck one another. While the last-described prior art installation does not require any separate measuring apparatus and current sources, it nevertheless entails the disadvantage that two arrangements have to be provided which are essentially separate from each other but which have to be completely identical in their construction whereby the difference is formed from the measured values thereof in order to determine the transmitted power.

The present invention has as its purpose to simplify the known power measuring apparatus, to avoid the necessity for obtaining any differences of the measured values, and especially to economize in the coils or windings. All of these aims are achieved in accordance with the present invention in that the twisting of two spaced cross sections of the transmitting shaft with respect to each other, conditioned on the transmission of a torque, adjusts a magnetic bridge arrangement rotating in unison therewith, and that this adjustment is utilized for the determination of the transmitted power. This magnetic bridge according to the present invention may be constructed advantageously according to the principle of a Wheatstone bridge and of the impedances thereof, in the present case of the reluctances thereof, at least one is changed by torsional twisting or relative angular displacement of the two shaft cross sections.

The electric resistances or impedances normally present in the Wheatstone bridge are replaced in the magnetic bridge according to the present invention by adjustable air gaps. The reluctances formed by these air gaps have to be constructed thereby in such a manner that the magnetic flux in the diagonal reluctance branch of the magnetic bridge is proportional to the transmitted torque. During standstill of the shaft or in case that no torque is transmitted thereby, no magnetic flux should flow or occur in the diagonal reluctance branch of the magnetic bridge. This has to be caused by corresponding adjustment and calibration of the other reluctances. With opposite changes in the reluctances of the two shaft cross sections utilized for measuring the output power, there is achieved a greater sensitivity during the reading. The magnetomotive force which is necessary for energizing the magnetic bridge arrangement may be produced by a permanent magnet or by an electromagnet built into the magnetic circuit.

For purposes of increasing the intensity of the current flow in the indicator instrument it is appropriate in accordance with the present invention to provide on the rotating shaft two or several cooperating magnetic bridge arrangements.

The magnetic currents occurring in the air gap forming the diagonal reluctance branch thereby induce, by reasons of the fact that the aforementioned air gap is conducted or guided past a stationary coil within a housing, an electromotive force in this coil which is proportional to the transmitted power and may be rendered visible or readable on an electric measuring instrument which is connected to the coil. The arrangement of the coils is made advantageously in a ring-like manner about the magnetic circuit and is secured within a stationary housing within which rotate the magnetic circuits. The coil arrangement may consist of several windings or coils past which is guided the air gap of the diagonal reluctance branch of the bridge during the rotation of the transmitting shaft.

Accordingly, it is an object of the present invention to provide a measuring apparatus for measuring the power transmitted by a shaft which obviates all of the shortcomings and disadvantages encountered with the prior art arrangement.

Still another object of the present invention resides in an arrangement for measuring the power transmitted by a shaft, which is simple in construction, relatively inexpensive in manufacture, easy to manipulate and reliable as well as accurate in operation.

Still another object of the present invention resides in the provision of and apparatus for determining the power transmitted by a shaft which requires relatively few parts, permits a direct reading of the power and obviates the need for separate measuring or auxiliary devices.

A further object of the present invention resides in the provision of a measuring device in the form of a magnetic bridge circuit which fulfills all of the aforementioned aims and objects in a simple and dependable manner.

Figure 2:
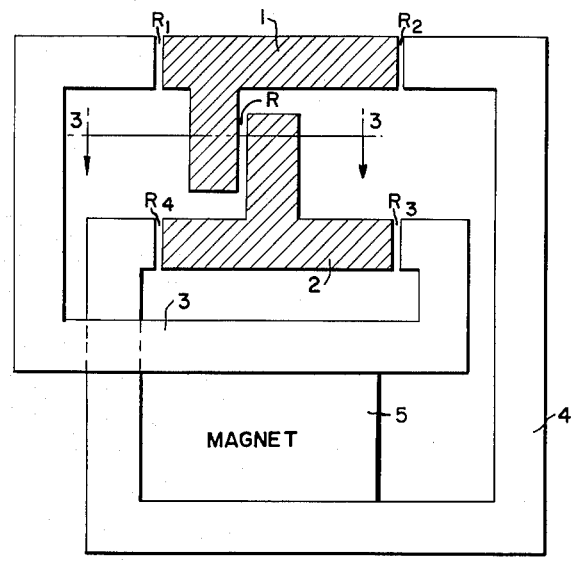

These and other objects, features and advantages of the present invention will become more obvious from the following description when taken in connection with the accompanying drawing which shows, for purposes of illustration only, one embodiment in accordance with the present invention and wherein:

FIGURE 1 is a schematic diagram of a Wheatstone bridge circuit,

FIGURE 2 is a somewhat schematic view of the structural parts forming the magnetic circuit in accordance with the present invention, developed or unfolded in a single plane, FIGURE 3 is a partial cross-sectional view taken along line III—III of FIGURE 2 through the transmitting shaft with the parts which form the magnetic circuits and with parts of the winding arrangement secured at the stationary housing, and FIGURE 4 is a longitudinal cross-sectional view through the upper portions of a shaft installation in accordance with the present invention.

The Wheatstone bridge which is known in the prior art where it normally serves for purposes of determining resistances or impedances and where it is normally traversed by electric currents, is composed in the case of the present invention of magnetic reluctances and traversed by magnetic fluxes.

The magnetic bridge utilized in the instant case is to be utilized as deflection bridge, that is, with a change in the reluctances such as $R_1$ to $R_4$ or any one thereof, there occurs at the bridge diagonal branch R a measured value proportional to a magnitude to be measured.

Referring now to the drawing wherein like reference numerals are used throughout the various views to designate like parts and more particularly to FIGURE 1, reference character M.M.F. designates therein a magnetomotive force of suitable type. For example, a permanent magnet or an electromagnet of suitable construction may be used. In the construction according to the present invention the reluctances $R_1$ to $R_4$ as well as the reluctance R of the magnetic Wheatstone bridge are constituted by air gaps. The connections for the magnetic flux analogous to the electric connecting lines are constituted by soft iron pieces dimensioned correspondingly large. The bridge is so adjusted that at the time during which no torque is transmitted by the shaft, no magnetic flux forms or exists in the diagonal reluctance branch R. In order to obtain a flux in the branch R which is proportional to or dependent on the torque, it suffices if one of the magnetic reluctances, for example, $R_1$ is changed as a function of loads on the shaft. The arrangement becomes more sensitive if the reluctances $R_1$ and $R_2$ or $R_3$ and $R_4$ change simultaneously by reason of the particular construction of the bridge, for example, as disclosed herein, and more particularly in such a manner that $R_1$ or $R_3$ becomes larger by an amount by which $R_2$ or $R_4$ becomes smaller. In addition to the increase in sensitivity, there is achieved furthermore a linear function or dependence of the flux in branch R as a function of the torque.

A further increase in sensitivity is possible if all four reluctances $R_1$ to $R_4$ are changed simultaneously, and more particularly in such a manner that $R_2$ and $R_4$ change by the same amount in the opposite direction or sense as $R_1$ and $R_3$. However, $R_1$ and $R_3$ or $R_2$ and $R_4$ cannot change or should not change simultaneously in the same sense.

An apparatus in which all four reluctances change during the transmission of torque will now be described hereinafter.

FIGURE 2 illustrates the magnetic circuit in accordance with the present invention as developed or unfolded in a single plane. In order to achieve a quiet operation or running of the shaft, it is appropriate to install along the circumference of the shaft at least two such magnetic circuits, and if space permits several such magnetic circuits. The air gaps are also designated in FIGURE 2 with $R_1$ to $R_4$ and R.

The cross hatched parts 1 and 2 of FIGURE 2 are connected with one shaft cross section whereas the non-cross hatched parts 3 and 4 are connected with another shaft cross section. The magnet 5 is also built into the circuit including the parts 3 and 4. The construction in accordance with the present invention clearly demonstrates that with an angular displacement or twisting of the shaft, $R_1$ and $R_3$ or $R_2$ and $R_4$ change in opposite directions as required hereinabove. On the other hand, the reluctance R remains constant. The change in the reluctances $R_1$ to $R_4$ and therewith the flux in R may be made visible externally in that the air gap R is permitted to move past a coil arrangement as shown in FIGURE 3 which is a cross section taken along line III—III of FIGURE 2.

Referring now to FIGURE 3, each time when the air gap R formed by the two pole shoes moves past a gap of the coil arrangement, the magnetic flux is split into a first portion $\phi_1$ and into a second portion $\phi_2$. The second flux portion $\phi_2$ is the useful flux, properly speaking, for by its existence in the windings 7 connected in series there is formed a voltage at the terminals 8 and 9 which is dependent on the product of the magnitude of flux $\phi_2$ and the speed with which the flux is created and disappears.

Since the magnitude of flux $\phi_2$ is proportional to the torque and the speed is proportional to the number of rotations, the voltage is therefore also proportional to the mechanical power transmitted by the shaft.

FIGURE 4 shows in longitudinal cross section a constructive embodiment of an apparatus in accordance with the present invention. The interconnected shaft 10 by means of which the torque is transmitted between the two flanges 11 and 12 carries in the plane 13 thereof a drum 14 on which are secured the pole shoes 15 which correspond to the structural parts 1 and 2 of FIGURE 2. In other words, all the cross hatched parts of FIGURE 2 are mounted on the drum 14 of FIGURE 4. The other non-cross hatched parts of the magnetic circuit (FIGURE 2) are secured within the plane 16 of FIGURE 4. Arms which extend parallel to the axis lead from the ring or annular member 17 toward pole shoes 15 so that the reluctances $R_1$ and $R_3$ are formed thereby. Corresponding arms lead from the ring or annular member 18 for the formation of the reluctances $R_2$ and $R_4$. A magnet 5 is interconnected or inserted intermediate the two rings 17 and 18. As shown in FIGURE 3, the magnetic reluctance R present on the drum 14 which remains constant moves below the coil 7 which is securely installed into the housing 19 and, as it passes this coil, it induces in the coil 7 a voltage proportional to the transmitted power which may be readily measured at the terminals 8 and 9 thereof.

While I have shown and described one embodiment in accordance with the present invention, it is understood that the same is not limited thereto but is susceptible of many changes and modifications within the spirit and scope of the present invention, and I, therefore, do not wish to be limited to the details shown and described herein but intend to cover all such changes and modifications as are encompassed by the scope of the appended claims.

I claim:

1. An apparatus for measuring the power transmitted by a rotating shaft, comprising a magnetic system operatively connected with said shaft for rotation substantially in unison therewith, and a stator arrangement provided with magnetizable elements and coils and surrounding said shaft, said magnetic system including four magnetizable parts, two of said magnetizable parts each being rigidly connected to a respective common one of two axially-spaced cross-sectional areas of the shaft, said four magnetizable parts being provided with two end surfaces each which extend substantially parallel to the shaft axis, the two magnetizable parts secured to one cross sectional area of the shaft facing with the end surfaces thereof the end surfaces of the other two magnetizable parts secured to the other cross sectional area of the shaft, and said four magnetizable parts effectively providing four air gaps the widths of which are dependent on the torsion of the shaft, the two magnetizable parts connected to one of said two cross sectional areas of the shaft being each provided with a further end surface, said two further end surfaces being disposed mutually opposite each other and forming therebetween an air gap with a substantially constant width, and said stator arrangement being magnetically coupled to said air gap having a substantially constant width for determining the power transmitted by said rotating shaft as a function of the width of said four air gaps effectively provided by said four magnetizable parts.

2. An apparatus for measuring the power transmitted by a rotating shaft, comprising a magnetic system operatively connected with said shaft for rotation substantially in unison therewith, and a stator arrangement provided with magnetizable elements and coils and surrounding said shaft, said magnetic system including four magnetizable parts, two of said magnetizable parts each being rigidly connected to a respective common one of two axially-spaced cross-sectional areas of the shaft, said four magnetizable parts being provided with two end surfaces each of which extend substantially parallel to the shaft axis.

the two magentizable parts secured to one cross sectional area of the shaft facing with the end surfaces thereof the end surfaces of the other two magnetizable parts secured to the other cross sectional area of the shaft, and said four magnetizable parts effectively providing four air gaps the widths of which are dependent on the torsion of the shaft, the two magnetizable parts connected to one of said two cross sectional areas of the shaft being each provided with a further end surface, said two further end surfaces being disposed mutually opposite each other and forming therebetween an air gap with a substantially constant width, said four magnetizable parts being so arranged and constructed that the reluctances formed by said four air gaps and said constant-width air gap are interconnected in the magnetic circuit like impedances of a Wheatstone-type bridge circuit, and said stator arrangement being magnetically coupled to said constant width air gap for determining the power transmitted by said rotating shaft.

3. An apparatus for measuring the power transmitted by a rotating shaft, comprising four magnetizable core elements operatively connected with said shaft for rotation substantially in unison therewith, means for providing a magnetomotive force and stationary coil means, said four magnetizable core elements and said means for providing a magnetomotive force being assembled into a magnetic bridge circuit forming a Wheatstone-type bridge having four reluctances in the four leg portions thereof and a further reluctance across two opposite terminals of the bridge, said four magnetizable core elements providing effectively therebetween four air-gaps with the widths thereof varying in dependence on the torque of the shaft and a further air-gap of substantially constant width, said four variable air-gaps forming effectively the reluctances of said four leg portions and said further constant-width air gap forming effectively said further reluctance, said further constant-width air gap rotating along said stationary coil means disposed outwardly thereof.

4. An apparatus for measuring the power transmitted by a rotating shaft, comprising four magnetizable core elements operatively connected with said shaft for rotation substantially in unison therewith, means for providing a magnetomotive force and stationary coil means, said four magnetizable core elements and said means for providing a magnetomotive force being assembled into a magnetic bridge circuit forming a Wheatstone-type bridge having four reluctances in the four leg portions thereof and a further reluctance across two opposite terminals of the bridge, said four magnetizable core elements providing effectively therebetween four air-gaps with the widths thereof of varying in dependence on the torque of the shaft and a further air-gap of substantially constant width, said four variable air-gaps forming effectively the reluctances of said four leg portions and said further constant-width air gap forming effectively said further reluctance, said further constant-width air gap rotating along said stationary coil means disposed outwardly thereof, and said four variable air-gaps being simultaneously increased and decreased, respectively, during the occurrence of torque in such a manner that the two diagonally opposite reluctances in the Wheatstone bridge are increased by substantially the same amount as the other two diagonally opposite reluctances are decreased.

5. An apparatus for measuring the power transmitted by a rotating shaft, comprising a magnetic system operatively connected with said shaft for rotation substantially in unison therewith, and a stator arrangement provided with magnetizable elements and coils and surrounding said shaft, said magnetic system including four magnetizable parts, two of said magnetizable parts each being rigidly connected to a respective common one of two axially-spaced cross-sectional areas of the shaft, said four magnetizable parts being provided with two end surfaces each which extend substantially parallel to the shaft axis, the two magnetizable parts secured to one cross sectional area of the shaft facing with the end surfaces thereof the end surfaces of the other two magnetizable parts secured to the other cross sectional area of the shaft, and said four magnetizable parts effectively providing four air gaps the widths of which are dependent on the torsion of the shaft, the two magnetizable parts connected to one of said two cross sectional areas of the shaft being each provided with a further end surface, said two further end surfaces being disposed mutually opposite each other and forming therebetween an air gap with a substantially constant width, said four magnetizable parts being so arranged and constructed that the reluctances formed by said four air gaps and said constant-width air gap are interconnected in the magnetic circuit like impedances of a Wheatstone-type bridge circuit, the magnetizable parts and the air gaps being so arranged that the diagonally opposite air gaps in said Wheatstone-type bridge circuit, are disposed, as geometrically viewed, along one side of the diagonal path of the bridge circuit,
and said stator arrangement being magnetically coupled to said constant width air gap for determining the power transmitted by said rotating shaft.

6. An apparatus for measuring the power transmitted during rotation of a machine part adapted to transmit torque, comprising magnetic Wheatstone-type bridge means, said magnetic bridge means including two relatively movable magnetic core structure means having a plurality of mutually facing portions and effectively forming two parallel magnetic paths each provided with a pair of series-connected reluctance means and a diagonal magnetic path connected between the point of connection of the two reluctance means of one magnetic path and the point of connection of the two reluctance means of the other magnetic path each of said reluctance means in said parallel paths being constituted by air gaps formed between mutually facing portions of said two relatively movable core structure means and being simultaneously adjustable upon relative movement between said core structure means, magnetic means connected to said two core structure means between the junctions of said parallel magnetic paths, means operatively connecting said core structure means with said machine part to adjust said bridge means in dependence on the relative angular displacements of two cross sections of said machine part in such a manner that the value of all of said reluctance means of said parallel paths are varied in such a manner that the ones of the reluctance means in each of said parallel paths that are located on one side with respect to said diagonal path change to the same extent in one sense as the other reluctance means in each of said parallel paths that are located on the other side with respect to said diagonal path change to a corresponding extent in the opposite sense whereby, respectively, the said ones as well as the said others of the reluctance means also change in opposite senses in the absolute values thereof, and means operatively connected with the diagonal magnetic path of said magnetic bridge means for determining the power transmitted by said machine part as a function of the flux in said path and the speed of rotation of said machine part.

7. An apparatus for measuring the power transmitted during rotation of a machine part according to claim 6, wherein said diagonal magnetic path is provided with an air gap constituting the reluctance means thereof.

8. An apparatus for measuring the power transmitted during rotation of a machine part according to claim 7, wherein said means for determining the power transmitted by said machine part as a function of the adjustment of said bridge means includes relatively stationary coil means, said coil means being so located and spaced from said diagonal magnetic path that the flux that may be present in the air gap thereof induces a voltage in said coil means during rotation of said machine part that is an indication of said power.

9. An apparatus for measuring the power transmitted during running of a machine part adapted to transmit torque, comprising magnetic Wheatstone-type bridge means, said magnetic bridge means including two relatively movable structural parts provided with a plurality of mutually facing portions and effectively forming two parallel magnetic paths each provided with a plurality of series-connected reluctance means, each of said two structural parts being also provided with two end faces, the reluctance means of said parallel paths being effectively constituted by the air gaps of mutually facing portions, means operatively connecting one of said structural parts with one cross section of said machine part and the other of said structural parts with another cross section of said machine part to adjust the reluctance means formed by said air gaps in dependence on the relative angular displacements of said two cross sections of said machine part, the end faces of one of said structural parts forming effectively the reluctance means of the diagonal path of the Wheatstone-type bridge while the end faces of the other structural part are adapted to be connected with a magnet, the reluctance means of said diagonal path being also formed by an air gap, and means operatively connected with said magnetic bridge means for determining the power transmitted by said machine part as a function of the adjustment of said bridge means by said relative movements including stationary coil means disposed in such relation to the air gap of the reluctance means of said diagonal path that a voltage is induced in said coil means when said last-mentioned reluctance means rotates past the same.

10. An apparatus for measuring the power transmitted during running of a machine part adapted to transmit torque according to claim 9, wherein said stationary coil means includes a plurality of individual coils which are combined in an annularly shaped manner and which surround the magnetic path of at least said diagonal path in a ring-shaped manner.

11. A magnetic Wheatstone-type bridge construction, comprising two relatively movable magnetic core structure means having a plurality of mutually facing portions and effectively forming two parallel magnetic paths each provided with a pair of series-connected reluctance means and a diagonal magnetic path connected between the point of connection of the two reluctance means of one magnetic path and the point of connection of the two reluctance means of the other magnetic path, each of said reluctance means in said parallel paths being constituted by air gaps formed between mutually facing portions of said two relatively movable core structure means and being simultaneously adjustable upon relative movement between said core structure means, magnet means connected to said two core structure means between the junctions of said parallel magnetic paths, said two core structure means being so constructed and arranged that the value of all of said reluctance means in said parallel paths are varied simultaneously in such a manner that the ones of the reluctance means in each of said parallel paths that are located to one side with respect to said diagonal path change to the same extent in one sense as the other reluctance means in each of said parallel paths that are located to the other side with respect to said diagonal path change to a corresponding extent in the opposite sense whereby, respectively, the said ones as well as the said others of the reluctance means also change in opposite senses as to absolute values thereof.

12. A magnetic bridge construction according to claim 11, wherein said diagonal magnetic path is provided with an air gap forming the reluctance thereof.

References Cited by the Examiner

UNITED STATES PATENTS

| 2,392,293 | 1/46 | Ruge | 73—136 |
| 2,461,685 | 2/49 | Godsey | 73—136 |
| 2,482,477 | 9/49 | Godsey | 73—136 |
| 2,579,629 | 12/51 | Tubbs | 73—136 |
| 2,737,049 | 3/56 | Waugh | 73—136 |

RICHARD C. QUEISSER, *Primary Examiner.*

ROBERT L. EVANS, JOSEPH P. STRIZAK, *Examiners.*